US010275506B1

(12) United States Patent
Schneider et al.

(10) Patent No.: US 10,275,506 B1
(45) Date of Patent: Apr. 30, 2019

(54) COORDINATING DATA ACROSS SERVICES (71) Applicant: Amazon Technologies, Inc., Reno, NV (US)

(72) Inventors: Donald Erik Schneider, Kirkland, WA (US); Kieran Sean Fitzpatrick, San Francisco, CA (US); Brian Mitchell Percival, San Carlos, CA (US); Anne Randolph Marshall, Seattle, WA (US); Philip Daniel Piwonka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 14/136,940

(22) Filed: Dec. 20, 2013

(51) Int. Cl.
*G06F 17/30* (2006.01)

(52) U.S. Cl.
CPC .............. *G06F 17/30575* (2013.01)

(58) Field of Classification Search
USPC ........................................................ 707/624
See application file for complete search history.

(56) References Cited

U.S. PATENT DOCUMENTS

| 6,820,111 | B1 * | 11/2004 | Rubin | G06F 17/30884 707/E17.114 |
| 8,423,532 | B1 * | 4/2013 | Beckford | G06F 17/30867 707/711 |
| 8,799,765 | B1 * | 8/2014 | MacInnis | G06F 17/241 715/230 |
| 8,803,817 | B1 * | 8/2014 | Froment | G06F 3/0488 345/1.1 |
| 9,116,862 | B1 * | 8/2015 | Rath | G06F 11/2097 |
| 2003/0154135 | A1 * | 8/2003 | Covington | G06Q 30/00 705/26.8 |
| 2006/0047639 | A1 * | 3/2006 | King | H04N 1/00244 |
| 2007/0276951 | A1 * | 11/2007 | Riggs | H04L 63/0428 709/229 |
| 2008/0168073 | A1 * | 7/2008 | Siegel | G06F 17/3002 |
| 2008/0270481 | A1 * | 10/2008 | Augustine | G06F 17/30581 |
| 2009/0100020 | A1 * | 4/2009 | Reddy | G06Q 30/0603 |
| 2011/0197236 | A1 * | 8/2011 | Rao | G06Q 30/02 725/74 |
| 2012/0047455 | A1 * | 2/2012 | Yuan | G06F 15/0291 715/781 |
| 2012/0218305 | A1 * | 8/2012 | Patterson | G06F 17/2235 345/652 |
| 2013/0179502 | A1 * | 7/2013 | Faller | H04L 65/403 709/204 |
| 2013/0239020 | A1 * | 9/2013 | Heo | G06Q 10/10 715/753 |

(Continued)

*Primary Examiner* — Kris E Mackes
*Assistant Examiner* — Lin Lin M Htay
(74) *Attorney, Agent, or Firm* — Lee & Hayes, P.C.

(57) ABSTRACT

This disclosure describes devices, architectures, and techniques to coordinate data related to separate services to help create a more robust user experience for a user accessing either or both of the separate services. For instance, if the user currently accesses two separate services that relate to a common subject matter, techniques of this disclosure will provide data from one of the services when the user accesses the other. In one example, an activity feed that includes activities relating to both a first service and a second service may be generated and displayed to a user accessing the first service.

24 Claims, 6 Drawing Sheets

(56) References Cited

U.S. PATENT DOCUMENTS

| | | | |
|---|---|---|---|
| 2013/0290234 A1* | 10/2013 | Harris | G06N 5/022 |
| | | | 706/46 |
| 2014/0032500 A1* | 1/2014 | Wibbeler | G06F 17/30011 |
| | | | 707/661 |
| 2014/0089775 A1* | 3/2014 | Worsley | G06F 17/30575 |
| | | | 715/230 |
| 2014/0118800 A1* | 5/2014 | Hwang | H04N 1/00331 |
| | | | 358/474 |
| 2014/0157103 A1* | 6/2014 | Lee | G06F 17/241 |
| | | | 715/230 |

* cited by examiner

COORDINATING DATA ACROSS SERVICES

BACKGROUND

A large and growing population of users is utilizing a varying array of electronic devices in everyday life. These electronic devices include tablet computing devices, smartphones, dedicated electronic book reader devices, desktop computers, laptop computers, personal digital assistants (PDAs), and the like. Users often use these devices to access an array of services, e.g., applications, for an array of purposes. Despite being accessible by the same device and, in some instances, offering similar or related content, the services may have varying capabilities and data structures, depending, for example, upon their design and implementation. In some instances it may be desirable to integrate functionalities and/or data associated with a first service into a second service, for example, to provide the user of the second service a more robust user experience.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

As mentioned above, electronic device users commonly access a plurality of different, but related, services. This disclosure describes architectures and techniques to correspond or share data unique to or created in association with one of a plurality of services, across those services.

For instance, envision that a user is an avid book reader who uses multiple, book-related applications. Each of the applications has different functionalities, may operate on a different core technology, and stores different information, but each relates generally to the user's love for books. Each of the services may allow a user to interact differently with one or more books or with other users who share the same passion for books. For example, the services may allow a user to create content, such as comments about books, reading lists, and rankings, to view other users' content, or to have a digital dialog with one or more users about one or more books. Because of this arrangement, in one instance, the user may be discussing the same book on two services, with different users. According to techniques of this disclosure, data is shared across multiple services, to provide the user with a more robust experience. According to some of the techniques described herein, data may be shared between the two services such that one or both of the services is enhanced.

In some implementations, all authoritative data of a certain type is stored at one of multiple services, regardless of where the data originates. Thus, when it is desired that data of a certain type be written, the techniques of this disclosure will write the data to the authoritative database in all instances. Local, replica copies of the data may be stored locally on the non-authoritative service, if the service receiving the request to write data is not a primary service having the authoritative database. Similarly, when it is desired to read data of a certain type, techniques of this disclosure will return accurate and up-to-date data in response to the request in all instances, regardless of whether the data is requested at the hosting service storing the data, or some other service.

In implementations of these techniques, different data may be treated differently. For instance, some data may not be shared across services, some data may be maintained separately by the two services but shared to some degree between those services, and/or some data, whether written to or requested at the first service or the second service, may be stored exclusively at one service. By way of non-limiting example, in some of the techniques described in more detail below, data from a first database associated with a first service may be forwarded to the second service.

In one illustrative example implementation of this disclosure, an activity feed may be provided to a user accessing one service, with activities in the feed originating from, or referencing, a second service. Various elements of the feed may be populated using relational references, whereas in some instances the elements may include copies of the data, for example, when an authoritative database may not be accessible. In the example above where the multiple services comprise book-related applications, such as platforms to share information and discuss books with other users, the information in this activity may relate to the users' reading activities. For instance, the activity feed may indicate when users begin books, complete books, rate books, purchase or otherwise obtain books, or the like.

This brief introduction is provided for the reader's convenience and is not intended to limit the scope of the claims, nor the preceding sections. Furthermore, the techniques described in detail below may be implemented in a number of ways and in a number of contexts. One example implementation and context is provided with reference to the following figures, and is described below in more detail. It is to be appreciated, however, that the following implementation and context is but one of many.

In addition, the term "electronic book," "eBook," "content," or "content item" as used herein, may include any type of content which can be stored and distributed in digital form. By way of illustration, and without limitation, electronic books and content items can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

Figure 1:
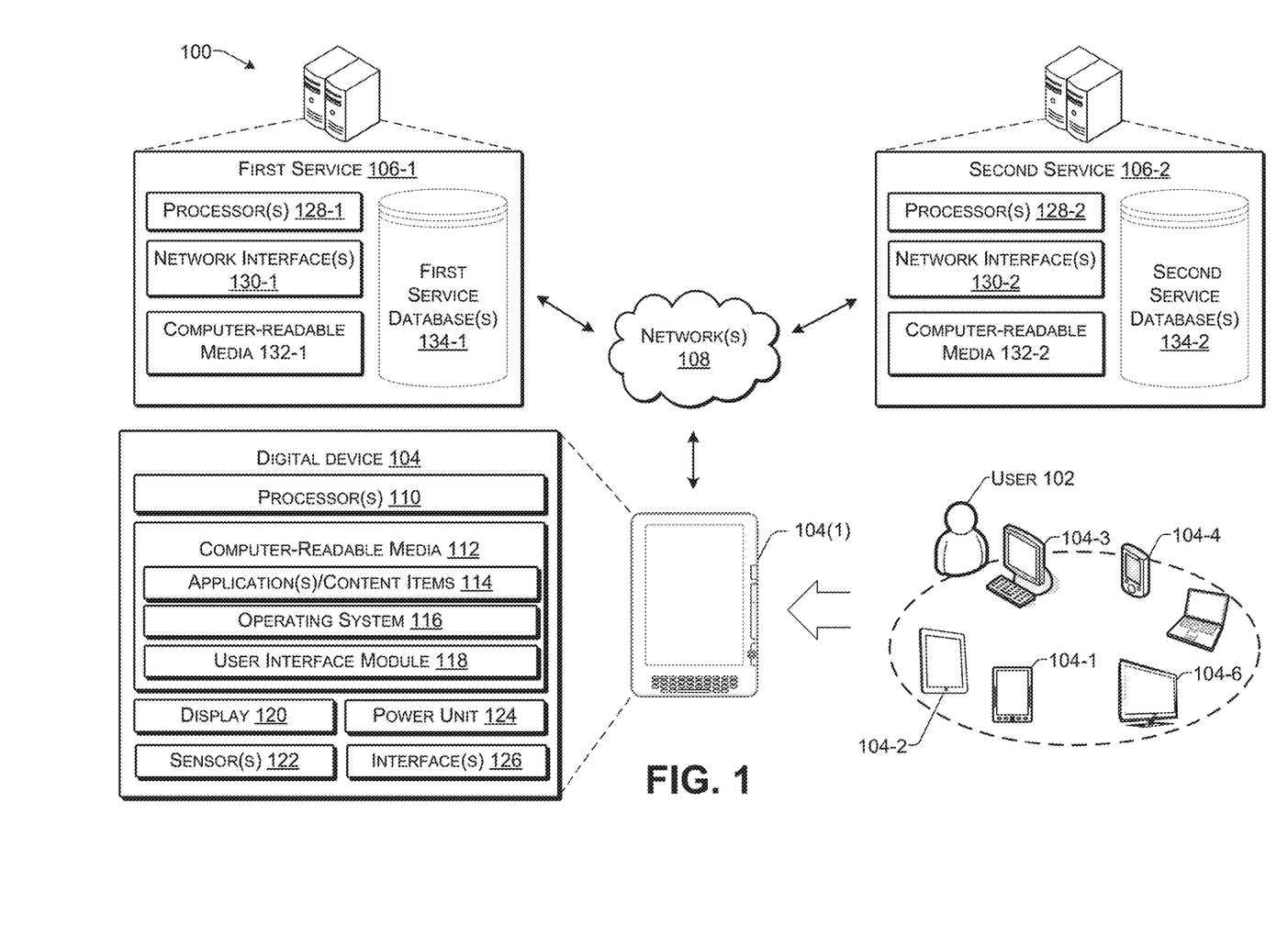
FIG. 1 shows functional components of an example environment to implement service integration techniques described herein, in accordance with an implementation.

FIG. 1 illustrates an example architecture 100 for enabling a user 102 operating at least one electronic user device 104-1, . . . , and/or 104-5 (also referred to herein in the singular as "a user device 104") to access a first service 106-1 and/or a second service 106-2. As will be described in more detail below, the services 106-1, 106-2 share data to provide some level of integration of the services 106-1, 106-2.

Within the architecture 100, the user device 104 accesses the first service 106-1 and/or the second service 106-2 via one or more networks 108. For example, the network(s) 108 may include a local area network (LAN), a wide area network (WAN), such as the Internet, or any combination thereof, and may include both wired and wireless communication technologies using any suitable protocols and communication techniques. The user device 104 and the services 106-1, 106-2 may communicate with one another over the network(s) 108. The network(s) 108 are representative of any type of communication network, including data and/or voice network, and may be implemented using wired infrastructure (e.g., wires, cable, CAT5, USB, fiber optic cable, etc.), a wireless infrastructure (e.g., RF, cellular, microwave, satellite, Bluetooth, etc.), and/or other connection technologies.

The user device 104 is configured to access the first and second services 106-1, 106-2 and may be any type of mobile electronic device (e.g., a laptop computer, a tablet computing device, a multifunction communication device, a portable digital assistant (PDA), an electronic book reading device, etc.) or non-mobile electronic device (e.g., a desktop computer, a television, etc.) Regardless of the specific implementation of the user device 104, this device 104 includes a processor 110 and computer-readable media 112. As used herein, a processor may include one or more processing units.

Depending on the configuration of the electronic device 104, the computer-readable media 112 (and other computer-readable media described throughout this disclosure) is an example of computer storage media and may include volatile and nonvolatile memory. Thus, the computer-readable media 112 may include, but is not limited to, RAM, ROM, EEPROM, flash memory, or other memory technology, or any other medium which can be used to store media items or applications and data which can be accessed by the electronic device 104.

The computer-readable media 112 may store any number of functional components that are executable on the processor 110, as well as data and content items that are rendered by the electronic device 104. As illustrated, the computer-readable media 112 may store one or more applications and content items 114, an operating system 116, and a user interface module 118.

In some instances, one or more of the applications comprise content presentation applications for presenting the content items, which may include eBooks, audio books, songs, videos, still images, and the like. For instance, the application may be an electronic book reader application for rending textual electronic books, an audio player for playing audio books or songs, a video player for playing video, and so forth. The applications may also include functionality to access and interface with the first and second services 106-1, 106-2. For example, through one of the applications, the user may request information from or write information to one of the services 106-1, 106-2. The operating system 116 may manage access to resources of the device 104, while the user interface module 118 may function to receive and route requests received from users operating the device 104.

As illustrated, the device 104 may further include a display 120 and one or more sensors 122. The display 120 may comprise any sort of display technology, including emissive display technology, reflective display technology, and the like. The sensors 122 may include, for example, touch sensors. The electronic device 104 may also include a power unit 124 and one or more interfaces 126. The power unit 124 provides power to the device 104, and may include a battery. The interfaces 126 may be network interfaces and may support both wired and wireless connection to various networks, such as cellular networks, radio, Wi-Fi networks, short range networks (e.g., Bluetooth, near field communication), IR, and so forth.

In some instances, the user device 104 may have features or functionality in addition to those illustrated in FIG. 1. For example, the device 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 104 may reside remotely from the device 104 in some implementations. In these implementations, the device 104 may utilize the interfaces 126 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc., for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer readable media.

The services 106-1, 106-2 are illustrated as remote services and may comprise one or more servers that form a portion of a network-accessible computing platform, implemented as a computing infrastructure of processors, storage, software, data access, and so forth that is maintained and accessible via a network such as the Internet. The remote computing resources of the services 106-1, 106-2 do not require end-user knowledge of the physical location and configuration of the system that delivers the services. Common expressions associated for these remote computing resources include "on-demand computing," "software as a service (SaaS)," "platform computing," "network-accessible platform," "cloud services," "data centers," and so forth.

The services 106-1, 106-2 may further store items (e.g., applications, content items, etc.) accessible to the device 104. In some instances, each of the services may be associated with a site, such as a merchant or service-provider website, and the site may be the means through which a user accesses items stored at the service(s). In some implementations, the site may offer content items for acquisition, such as digital works, electronic books, newspapers, music, movies, and so forth. And the site may include functionality, e.g., a user interface, through which a user may create and/or upload content. For example, a user may be able to comment, e.g., rank, evaluate, or engage in a discussion of a book available through the site. The site may also, or alternatively, provide online content, such as web content or other digital content, to an online or mobile application, such as an application on a mobile device. As one example, the site may provide content accessible through an online or mobile application executing on a mobile device, such as the device 104, and may provide functionality for a user of the mobile device to create and/or upload content, e.g., comments or the like. Accordingly, the site is not limited to a website accessed by a browser, but may encompass other technologies.

The services 106-1, 106-2 are separate, in that they may each contain different data and provide different functionalities. In some implementations, each of the services is hosted on separate and/or different technology stack, and has an associated database storing different information. The services may be separated geographically and/or by a firewall. Access to each of the services may be restricted, such that access to the service for reading and/or writing may be limited. For example, users may access and/or write data to the services via a site associated with the service upon becoming a member of the site, for example, by subscribing, joining, creating a profile or account, or otherwise. In other instances the services may allow anonymous use thereof. In some implementations, the services 106-1, 106-2 are related. The relationship may be based on subject matter, e.g., both services relate to books or sports, based on membership, e.g., both services have overlapping membership, or based on some other criteria altogether. Related services may better benefit from the data sharing techniques described herein as they may include complementary data and functionality that will enhance the user experience.

In one example, discussed in more detail below, both services may relate to books. More specifically, the user 102 may download and read books, such as eBooks, on the user device 104. To this end, the user may access a first service, such as a service associated with an online marketplace or store, to acquire those books. Through a site accessible to the user, the service may support additional functionality, such as allowing a user to rate books, to comment on books, and/or to include books in a queue, such as for reading or purchasing. Other services also exist relating to books, which may also be accessed by the user 102 on the user device 104 via one or more sites. For example, a user may access one of those additional services via a site to engage in group discussions about books or have other social interactions with other book enthusiasts. The additional service(s) and related site(s) may also allow the user to create and/or share additional book-related content, such as notes, quizzes, and/or study guides. In this example, while functionalities and data may be quite different as between the multiple services, there also may be some overlap in services and/or data. For example, each book-related service likely includes a catalog of books and accompanying information about the books. Using techniques of this disclosure, the services may share data to bolster operation and enhance the user experience.

The services are book-related in the foregoing example, but in other instances techniques of this disclosure may be used to coordinate, by way of non-limiting example, information for music- or movie-related services, social media services, news-related services, sports-related services, parenting-related services, or combinations thereof.

As illustrated, each of the services 106-1, 106-2 may include one or more respective processor(s) 128-1, 128-2, one or more respective communication interface(s) 130-1, 130-2, respective computer-readable media 132-1, 132-2, and one or more respective database(s) 134-1, 134-2.

Figure 2:
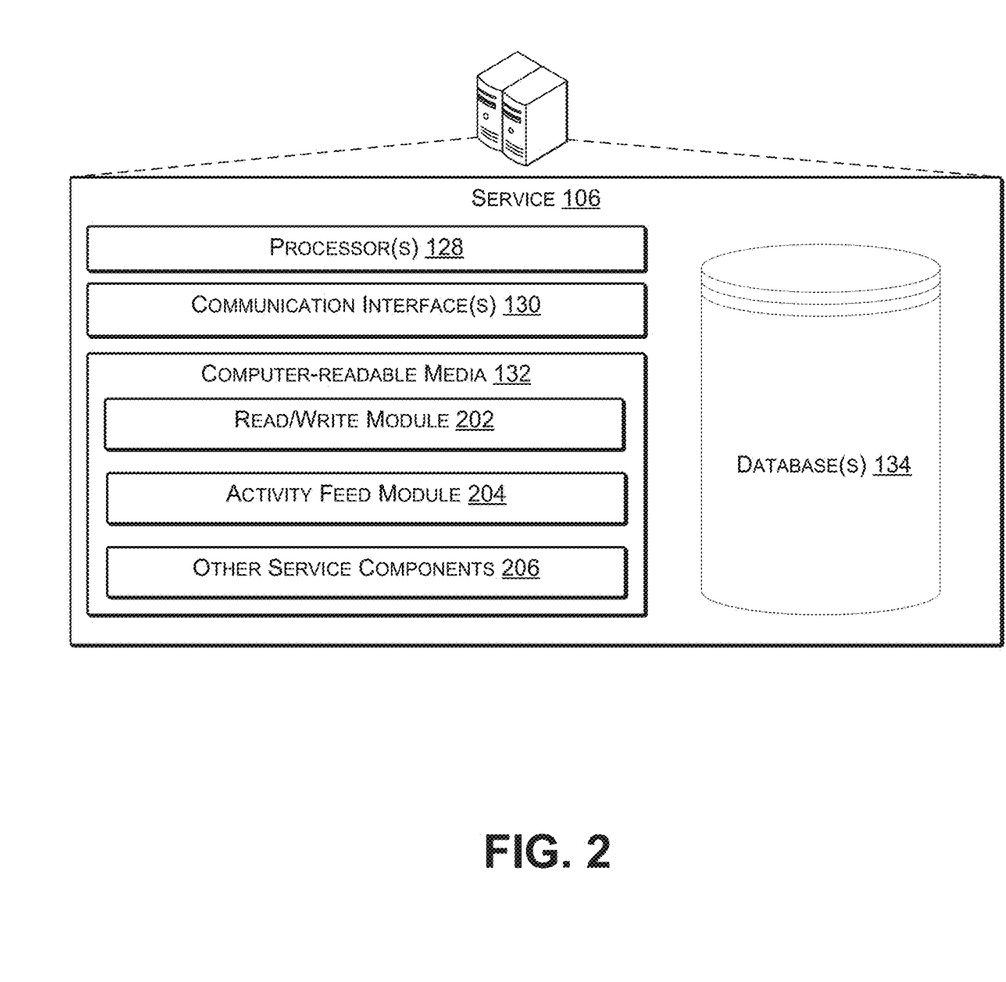
FIG. 2 shows functional components of a service, such as one of the services illustrated in FIG. 1, configured to implement techniques described herein, in accordance with an implementation.

FIG. 2 further illustrates a generic service 106, which may represent either or both of the first and second services 106-1, 106-2. As described above with relation to FIG. 1, the service 106 includes the processor(s) 128, the communication interface(s) 130, the computer-readable media 132, and the database(s) 134. The computer-readable media 132 may store a read/write module 202, an activity feed module 204, and other service components 206.

The read/write module may function to receive and fulfill requests to read data from or write data to the database 134. In some implementations, the requests may come from a user device 104, for example as a result of a user interaction with the user device 104. In some other implementations, the requests may come from another service, such as in the form of a call or an instruction. Requests from another service may or may not be as a result of a user interaction with the other service. As will be described in more detail below with reference to FIGS. 3-5, the read/write module may be programmed to process different requests in different manners, depending upon such factors as a type of data requested, for example.

The activity feed module 204 may produce an activity feed for display to a user on the user device. The activity feed is one example of how the techniques disclosed herein can provide a user with a more robust user experience, through the coordination of data from two separate services. As will be described in more detail below with reference to FIG. 6, an activity feed generated by the activity feed module 204 may include a list of activities relating to or originating at different services, for presentation to a user accessing a single service. In some implementations, the activity feed module 204 may cooperate with the read/write module 202 to obtain data from the plurality of services for displaying those activities and/or information related to the activities.

Figure 3:
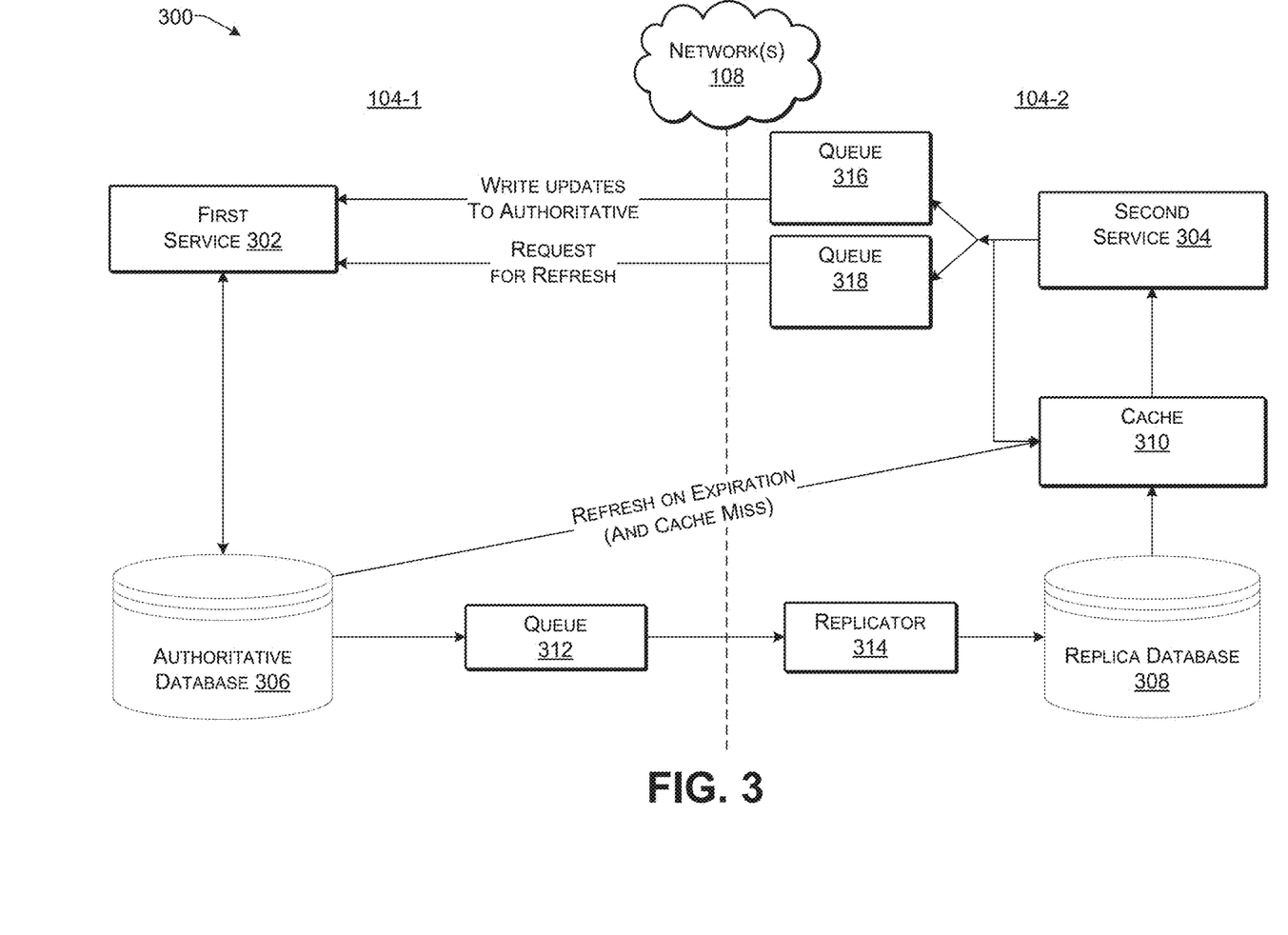
FIG. 3 is a schematic representation of components of first and second services that are to be coordinated.

FIG. 3 is a schematic drawing that will be used in connection with a description of example techniques for sharing information across two services 104-1, 104-2. In the scheme 300 of FIG. 3, one of the services 104-1, 104-2 serves as a master or primary service 302 and the other is designated as a secondary service 304. As a result of the designation, the database associated with the primary service 302 is an authoritative database 306, meaning that the data it stores supersedes all other data. A database associated with the secondary service 304 is a replica database 308, which may store replica copies of data from the authoritative database 306. The replica database is a local database, which generally means that its data are stored so as to be more readily accessible to the secondary service than data in the authoritative database. For example, the services may be separated by one or more firewalls, and the replica database may be behind the same firewall as the secondary service. In this manner, receiving the data may not require navigating a firewall. Although a local database may be one that is contained on the same machine or group of machines as other portions of the service and/or one that is in geographically proximity to those portions, such is not required.

Data may be stored in the authoritative and replica databases 306, 308 in any manner. For example, in some instances, data in the databases is stored as relational data. As will be appreciated, a replica database need not store a copy of all data contained in the authoritative database, and in some instances, the replica database may store data additional to the replica data.

A cache 310, a queue 316, and a queue 318 may also be provided in association with the secondary service 304. Moreover, the primary service 302 may also include a queue 312, which may cooperate with a replicator 314 to store copies of data from the authoritative database 306 onto the replica database 308. The functionality of the queues 312, 316, 318 and the replicator 314 will be described in more detail, below. Although illustrated as being associated with respective services, the queues may reside on the other service illustrated in FIG. 3 or may reside somewhere else entirely, such as remote to both services, but accessible via a network.

While the first service 106-1 (or the second service 106-2) may be determined the authoritative service 302 for all data, in other implementations, the primary/secondary designation is made at a more granular level. Specifically, data may be parsed into data types, with the primary/secondary designation being determined for each data type. Moreover, the data types may be delineated based upon any characteristic. In some examples, one service's database may be authoritative for all bibliographic information, e.g., title, author and/or illustrator information, title, and the like.

In another example, one database may be authoritative for all data relating to activities performed by users interacting with the respective services. In an example described below with reference to FIG. 6, users may perform activities that relate to books. For example, a user may interact with a site to comment on a book, or to rank a book, or to otherwise create content. In this example, data about each activity is associated with the book or books to which it pertains, and that activity data may be stored on one database, whether created using the first or second service. As will be described in more detail below, replica copies of the data may be stored locally (i.e., at the non-authoritative service), but there is one authoritative version of the activity data. In this manner, when a user requests information about the book, whether from the first service or the second service, a single authoritative copy of all activity data relating to that book is maintained authoritatively on a single database. In one example, the activity data may be used to populate an activity feed. The activity data may include content generated via the activity, e.g., the corpus of a comment or review, or it may include an indication or reference that the user has performed the activity. In the latter example, the actual content created, e.g., the textual corpus of the review or the like, may be stored on the database with which the activity was created.

In other implementations, the data type may also depend upon details surrounding creation of the data. For example, the first service 106-1 may be determined to be the primary service 302 (and thus possess the authoritative database 306) for comments or user book reviews that originate from a user interaction with a site associated with the first service. Similarly, the second service 106-2 may be determined to be the primary service 302 (and thus possess the authoritative database 306) for the same kind of data, i.e., comments or user book reviews, but that originate from a user interaction with a site associated with the second service. Thus, in this example, the data type is delineated based upon where, i.e., through which service, the data was created. By way of another non-limiting example, it may be desirable to designate the first service as the primary service for data relating to a user's profile information with a site associated with the first service and the second service as the primary service for data relating to a user's profile information with a site associated with the second service. The user's profile information may include a customer identification number unique to the respective site, privacy settings, or the like. Data types may be determined by any quantifiable or distinguishing characteristic.

Figure 4:
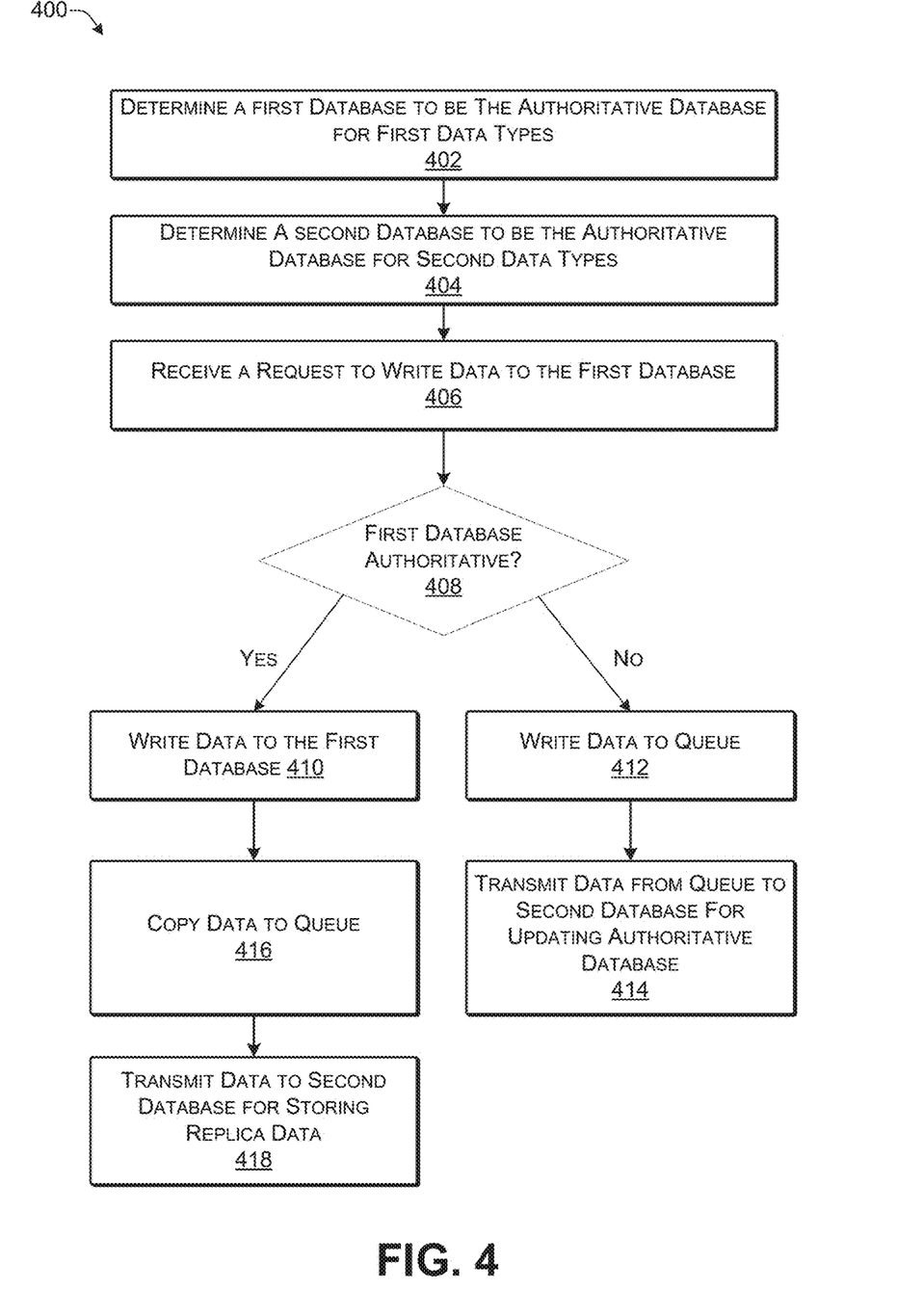
FIG. 4 depicts a flow diagram of an example process for processing a data write to one of two services sharing information, in accordance with an implementation.
Figure 5:
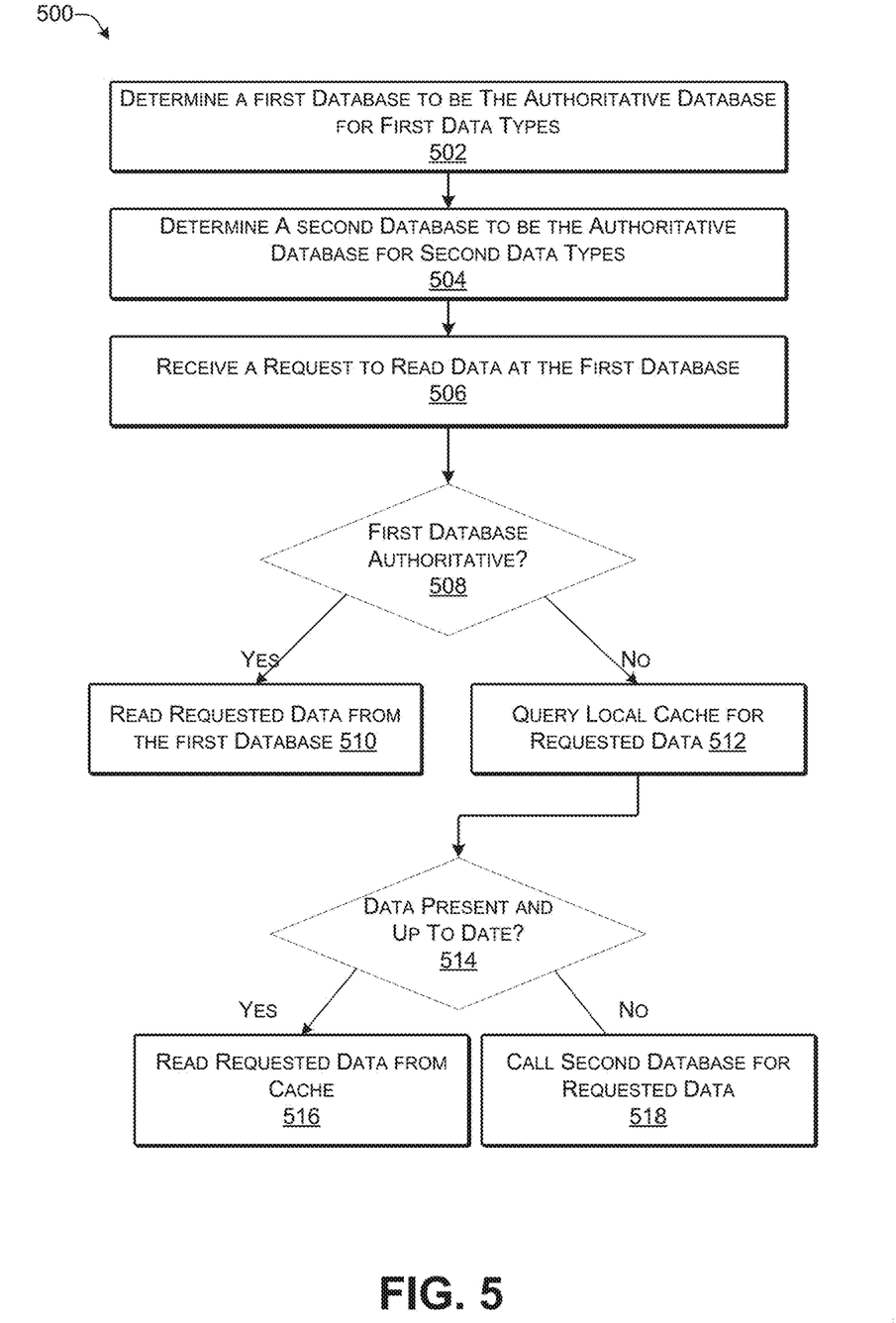
FIG. 5 depicts a flow diagram of an example process for processing a request to read data at one of two services sharing information, in accordance with an implementation.

FIGS. 4 and 5 depict flow diagrams of example processes 400, 500 for reading and writing data, respectively, in an environment such as is illustrated in FIG. 3. These processes 400, 500, as well as each process described herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Further, while FIGS. 4 and 5 are described as being performed by an electronic device, in some instances other entities may perform the processes 400, 500, and/or different operations of the processes 400, 500 may be performed by different devices or entities.

At 402, a first of two databases is designated as an authoritative database for first data types, and at 404, the second of the databases is designated as an authoritative database for second data types. Each of the first and second databases is associated with a respective service accessible by a user. As used herein, a data type generally refers to a categorization of the data, and the categorization may be determined based on any number of criteria. For example, data may be categorized based on characteristics of the data, such as where (e.g., at which service) or when the data was created, and/or based on the actual data (e.g., book titles, user identifications, profile information, privacy settings). In other implementations, one database may be deemed authoritative for all data and data types.

At 406 a request to write data to the first database is received at the first service. The request may come as the result of a user interaction with a user device accessing the first service. For example, a user accessing the first service may desire to make a change to current information, such as update profile information associated with the first service, or may create information according to the functionality of the first service. For instance, the first service may allow a user to create ratings or post comments. In other implementations, the request to write information may come from a separate service, or from some other source altogether.

As will be appreciated, in the scheme 300 described above, all new data, including updates to existing data, should be written to the authoritative database. Accordingly, at step 408, a determination is made as to whether the first database, i.e., the database associated with the service at which the request to write was received, is the authoritative database. Step 408 may be accomplished by determining a type of the data being written, and determining whether the first database is authoritative for that data type. For example, the data type of the data being written may be compared to a list of data types stored at the first database.

If a determination is made at 408 that the first database is the authoritative database, at 410 the data is written to the first database. This, for example, is the case in which the request to write is received at service 104-1 in FIG. 3.

If, however, a second database is determined to be authoritative for the data requested to be written, at 412 the data is written to a queue, such as queue 316, associated with the first service. This, for example, corresponds to the case in which the request to write is received at service 104-2 in FIG. 3. From the queue, at 414 the data is transmitted from the first service to the second service for writing to the authoritative database. The data may be written from the queue to the authoritative database according to pre-defined criteria. For example, the writes in the queue may be processed in a batch. The batch may be processed once it reaches a certain size, when traffic on the network or at one of the services is below a threshold level, or based on any other criteria. Other writes may be done based on similar criteria and/or based on a time in the queue In other implementations, block 412 (and thus queue 316) may be optional. That is, upon determination that the first database is not the authoritative database, the data-to-be-written may be transmitted directly to the second service for writing to the second database.

Other modifications are also contemplated. For example, at 416, data written to the authoritative database may also be copied to a queue (such as queue 312) associated with the service having the authoritative database (the second service in the example of FIG. 4). At 418 that queued data is transmitted to the second service for storing as replica or cached data. The second service may include the replicator 314 for creating the replica data. As with the queue 316 discussed above, the queue 312 may be emptied based on any criteria. According to this arrangement, replica and/or cached data may be updated asynchronously, so as to improve overall throughput for the system. For example, the replica database data may be written from the queue to the replica database when traffic at the service(s) is below a threshold, to minimize system slow down.

As will be appreciated, the process 400 functions to ensure that data is written to an authoritative database, whether that database is associated with the service receiving the request to write the data, or with a different service. In this manner, a master copy of the data will always exist. Storing the master copy at a designated authoritative database may allow for integration of the services, because a call for information at any service will be answered with correct and up-to-date information. Maintaining the data separately, across databases, may reduce reliability of the information and increase the number of reads and writes required to retrieve and update data. Moreover, in those instances in which services have the same type of data, e.g., a catalog of books or activities relating to books, the schemes described herein will reduce the amount of memory required by obviating the need to maintain essentially identical databases in different locations.

Processes for retrieving data from the system 300 described above will now be described with reference to FIG. 5. In FIG. 5, a process 500 includes, at 502, determining a first database to be an authoritative database for first data types and, at 504 determining a second database to be an authoritative database for second data types. For a given system, 502 and 504 are identical to 402 and 404 described above, and may be performed at the time of establishing rules for sharing information between and among the services. Put another way, the authoritative/secondary database determination is made system-wide, and thus is the same regardless of whether data is being written to or read from the database(s).

At 506, a request to read data is received at the first service. The request may come from a user interaction with the first service, or it may come from some other place, such as another service. As will be appreciated, it is desirable to respond to the request with authoritative data, as opposed to replica data, unless it can be determined that the replica data is current and correct. To this end, at 508 it is determined whether the first database, i.e., the database associated with the service receiving the request, is the authoritative database for the requested data.

If the database associated with the service receiving the read request is the authoritative database, at 510 the data is read from the first database. This example corresponds to an instance in which the read request is received by Service 104-1 in FIG. 3. Although not illustrated, the read data may be communicated or otherwise conveyed to the entity requesting the data.

If the database associated with the service receiving the read request is not the authoritative database, e.g., the request is received at the Service 104-2 in FIG. 3, at 512 a local cache is queried for the requested data. At 514 it is determined whether the requested data is present in the cache and whether that data is up to date. For example, rules may be established for the system 500 such that data over a certain age is considered expired, and thus not usable. If the data is in the cache and is up to date, at 518 the requested data is read from the cache. If the data is not in the cache or the data has expired, at 520 the service calls the authoritative database to retrieve the master data fulfilling the request. Although not illustrated, data read from the cache or received in response to the call may then be communicated or otherwise conveyed to the entity requesting the data.

The local cache queried at 512 may be arranged in any number of conventions. For example, the cache may be a conventionally known pull through cache or a push cache or a combination thereof, as required to refresh the cache. For example, the service with which the cache is associated may receive new data from the master, e.g., via a push arrangement. The data may be pushed upon writing, or may be queued, such as at queue 312, at the authoritative service for scheduled and/or otherwise controlled transmission to the secondary service. The service with which the cache is associated may additionally or alternatively call the authoritative database to receive new data. For example, when data stored in the cache expires, a call may be made to the primary service to refresh the cache. The call to refresh the data may be made directly to the authoritative service upon expiration of the data in the cache, or a request to refresh the data may be queued, such as at the queue 318 in FIG. 3, for subsequent transmission to the authoritative database. Requests in the queue 318 may be processed in the same manner as those in the queues 312, 316, described above. Other modifications to the cache will also be appreciated by those having ordinary skill in the art.

The architectures and processes described above are useful for sharing data between two distinct services. As will be appreciated, services that are more closely related may benefit more greatly from the techniques of this disclosure. For example, services that store similar information may benefit from the shared data structures described above, because the data may be stored only at one of the services. In other instances, data written to one of the services may be stored only at the service, although it may be accessible at another service, for example, by querying the database over a network.

A specific example of a shared data arrangement will now be described with reference to FIG. 6. Specifically, in this example, two services, service A and service B (corresponding to the services 106-1, 106-2) both relate to book reading, and the techniques of this disclosure are used to enhance the user experience for a user accessing one or both of those services. In this example, a user may access each of service A and Service B through a respective site, Site A and Site B. The user may have an account with each of Site A and Site B, for example, including. Using each of those accounts, the user may have created any amount of data. For example, the user may have created a profile, which may include a name and other user-specific information. The user may also have created activity data related to one or more books. For example, the user may have rated one or more books, commented on one or more books, created notes or other ancillary content related to books, and/or indicated whether the user has read or desires to read certain books. In still other instances, the services may facilitate creation of, and the user may have created, social relationships, such as conventionally known friend and/or follow relationships. In addition to the user-created content, Services A and B may also store other information, which may be generic to all users. For example, each of the services may have a catalog of books and could store an identification of the book, bibliographic information such as about the author, publisher, or the like, and/or images associated with the book. Such generic information may be created by one or both of the sites/services, e.g., at the time of creation or update, by a user who uploads the information, or it may be obtained from a third party. For example, bibliographic information may be received from a publisher of the books, for example, upon release of a new book, and that bibliographic information may be integrated into the databases associated with the services.

Each of the data described above may be stored and maintained on databases associated with the respective services, or may be shared, as in the arrangement of FIG. 3.

Figure 6:
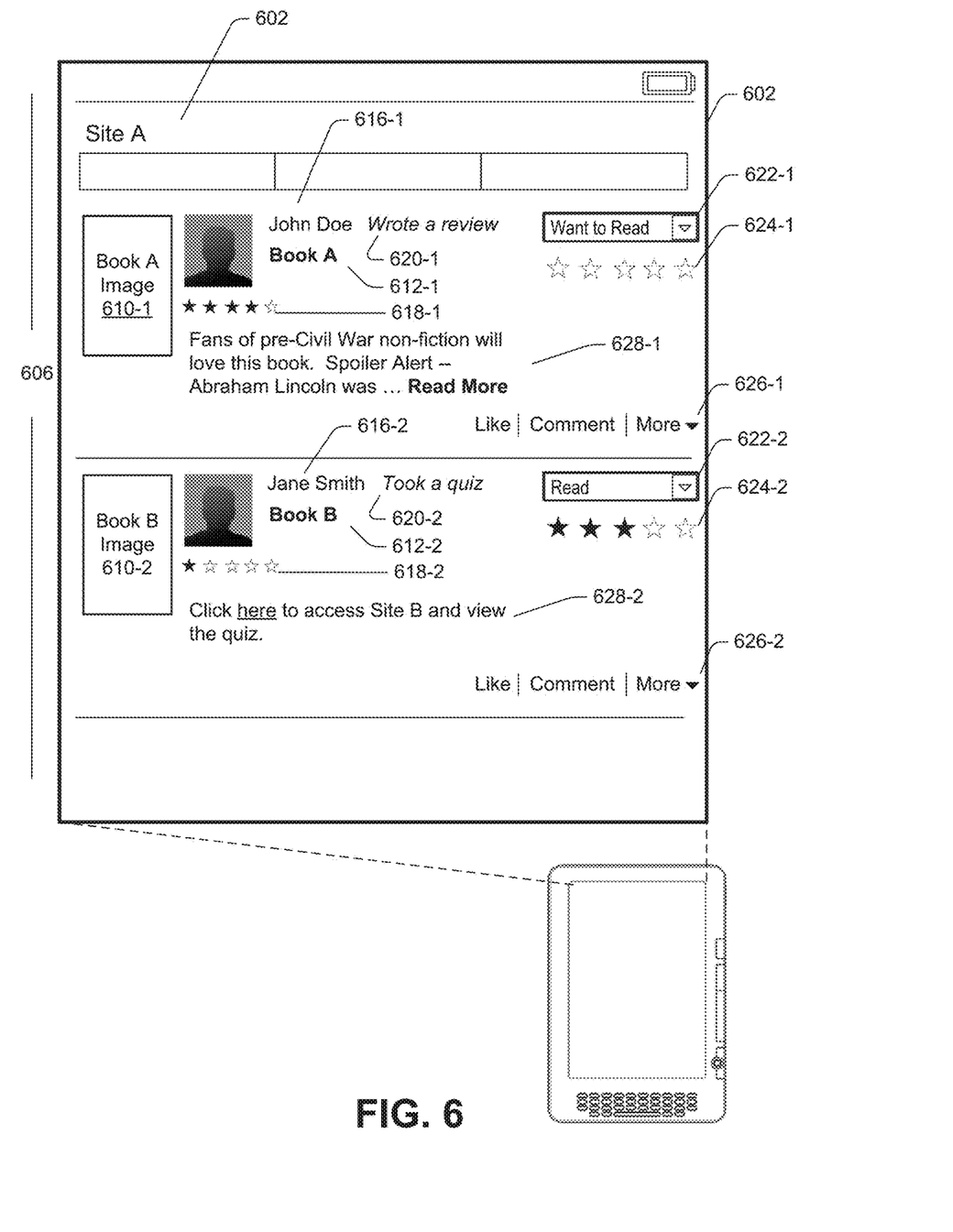
FIG. 6 shows an example user interface of the user device of FIG. 1 including an activity feed, in an implementation of the invention.

In the example of FIG. 6, a user device 104 has accessed service A (via Site A) and a user interface 602 has been displayed on the display of the user device 104. The user interface 602 includes an indication 604 that the user is accessing Site A, and includes an activity feed 606 showing one or more activities 608-1, 608-2. The activity feed 606 is illustrated as a vertically-arranged list of activities, but other orientations and presentations may be used.

In the example implementation, each activity 608-1, 608-2 includes an image 610-1, 610-2 of the book to which the activity relates and other book identification information 612-1, 612-2, which may include the title of book. Each activity 608-1, 608-2 also includes information about a user that performed the activity. For example, a graphical representation 614-1, 614-2 of the user, such as a profile picture or a user-chosen avatar, a user name 616-1, 616-2, and a user ranking 618-1, 618-2 may be provided with the activity 608-1, 608-2. The user ranking 618-1, 618-2 is illustrated as a star-based ranking system, which allows a user to rank the book by assigning the book a number of stars. In the illustration, ranking 618-1 indicates that John Doe gave Book A a ranking of four out of five stars and ranking 618-2 illustrates that Jane Smith gave Book B a ranking of one out of five stars.

Each activity 608-1, 608-2 preferably also includes an activity descriptor 620-1, 620-2, indicating a type or description of an action taken by the user. The activity descriptor 620-1, 620-2 may refer to any activity performed. The illustrated activity descriptors 620-1, 620-2 relate to writing a review and taking a quiz, respectively, but could also refer to creating comments, changing or updating a user status, finishing or starting a book, creating or updating a relationship, rating a book, or any other activity.

The activity feed 606 may also include user interface elements that facilitate additional interaction of the user with the service and/or with specific activities. The user interface elements may be any interactive features through which the user interacts with the interface and the site. For example, the user interface elements may include selectable icons or images, virtual controls, buttons, such as radio buttons, text input fields, links, drop-down menus, voice command interfaces, and so forth. FIG. 6 illustrates for each activity 608 in the activity feed 606, a book status user interface element 622-1, 622-2 that displays a text box including a relationship of the user using the service to the book that is the subject of the activity 608-1, 608-2. The user interface element 622-1, 622-2 also includes a radio button that may be selected by a user to expose a drop down menu that is pre-populated with entries for the text box. Some example entries may include "read," "want to read," or "reading." Each activity may also include a rating convention 624-1, 624-2. In this example, the rating conventions 624-1, 624-2 are star-based in the same way as the user rankings 618-1, 618-2 described above. In one implementation, the rating conventions 624-1, 624-2 merely illustrate a ranking predetermined by the user for the book that is the subject of that activity, whereas in other implementations, the rating conventions 624-1, 624-2 may be interactive, allowing a user to rank the book directly at the activity. Schemes other than star-based schemes may also be used for any of the rating conventions and the rankings.

Additional user interface elements 626-1, 626-2 may also be provided for each activity. FIG. 6 illustrates a "Like" element, which a user may select to indicate their approval of the activity and a "Comment" element, which the user may select to leave a comment on the activity. In one implementation, selecting the "Comment" element will open a dialog or text box into which the user may enter his comment. The additional user interface elements 626-1, 626-2 may also include additional features, as generically illustrated by the "More" element. Selecting the "More" element may open an additional menu of features.

Each activity also includes activity-related content 628-1, 628-2. The activity-related content has some relationship to the activity 608-1, 608-2, and may provide access to some other content or information. In the example of activity-related content 628-1, some or the entire corpus of John Doe's review (the creation of which prompted inclusion in the activity feed 606) is provided. Here, to conserve space in the activity feed 606, only a part of the corpus of the review is provided as the activity-related content 628-1. The user is then provided with a selectable user interface element 630 (designated here by the word "More") to expand and view the remainder of the review. In other implementations, all of the review may be included in the activity-related content 628-1.

In the example of the activity 608-2, the activity descriptor is "took a quiz," and the activity-related content 628-2 comprises the text "Click here to access Site B and view the quiz." Thus, the activity-related content provides a link to information or data associated with the activity, but does not actually include the content, i.e., the quiz in this example.

As will be appreciated, the various elements that make up the user interface 602 may originate from either Service A or Service B, despite the fact that Service A generated the activity feed. In instances in which data is stored in a cached scenario such as that illustrated in FIG. 3, Service A will have the master database only for some elements. For example, the master data for all book information, such as title, author, publisher, and associated images of the book, may be stored on Service B, with Service A having only a cache or replica copy. Thus, a request to populate, i.e., to read the data corresponding to, the book image 610-1, 610-2 and title 612-1, 612-2 elements may be processed as described above with respect to process 500 in FIG. 5. Similarly, if the user interfaces with the user interface 602 to update or create data, e.g., by writing a comment, liking an activity, rating a book, etc., that request to write will be received at Service A, which may apply some or all of process 400 to properly store the data. In some instances, although the request to write is received at Service A, the data will ultimately be stored at a database associated with Service B.

In some implementations, data is stored as relational data. Accordingly, when the service instructs display of the activity feed to a user device, those instructions may include data obtained by calling from one of the databases of Service A or Service B, with the expectation that the device will use that data to populate the elements. However, in some implementations, for example when the user device may not be connected to a network at all times, activity service may not always be able to call an application programming interface (API) to access the information associated with the references. In such an instance, a copy of some or all of the relational data may be stored locally, e.g., on the user device. Thus, elements of the feed may always be populated with data, even if only a copy.

In other implementations, a decision may be made to remove references to authoritative data because it may be too onerous to read all relational data. For example, some services may not support presentation of the relational data or there may be legal repercussions for presenting data created at one service on another service. The activity 608-2 is an example of limiting an amount of relational data in an activity feed. Specifically, that activity indicates that Jane Smith took a quiz. In this example, the quiz was accessed and completed by Jane Smith using Site B, and the quiz and Jane's results are stored on a database associated with service B. While the feed could include a selectable reference to the quiz, stored on service B, in the example the user may only access the quiz by navigating away from Site A, to Site B. In other implementations, some of the relational data, for example, information about the quiz, such as the author of the quiz, how Jane fared on the quiz, and/or a sample question from the quiz, may be provided to the user, either by reference or as a copy of that information.

In the example of FIG. 6, were the user to access Site B, he may be presented a similar activity feed. However, in that feed an activity corresponding to activity 608-2 in FIG. 6 could include a reference or link directly to the quiz. In other embodiments, the activity feed at Site B may look quite different from the activity feed 602. For example, the activity feed at Service B may not include some or all activities originating at Service A.

Although examples have been described herein in which services are book-related services, those having ordinary skill in the art will understand that the techniques and processes described herein may be applied to any number of applications in which it is desirable to share data across separate services.

Moreover, although this disclosure has been primarily described as providing techniques for corresponding data between two different services, the techniques may similarly be applied to more than two services. Moreover, while many of the embodiments discuss first and second services, each having a corresponding database, and wherein one of the services is accessed to read and/or write data, it is also contemplated that a third service, in communication with the first and second services 116-1, 116-2 may perform many of the functions described above. For example, the third service may communicate with both the first and second services to create an activity feed. Moreover, a third service may receive the instruction to write the data to the first and/or second service and the request to read data. By way of one, non-limiting example, in the case of the book-related services described above, each of Service A and Service B may be accessible separately, whereas a third service that utilizes the techniques described herein may coordinate data from the first and second services to provide additional functionality.

Although implementations have been described in language specific to structural features and/or methodological acts, it is to be understood that the disclosure is not necessarily limited to the specific features or acts described. Rather, the specific features and acts are disclosed herein as illustrative forms of implementing the implementations.

What is claimed is:

1. One or more computing devices comprising:
   one or more processors;
   computer readable media;
   at least one module maintained on the computer-readable media and executable on the one or more processors to perform operations that include:
   providing via a first application a first service to user devices over a network, the first service including providing a first forum in which user devices accessing the first application can perform actions including generating comments relative to electronic books;
   receiving, from a first user device that is accessing the first application, a comment related to an electronic book;
   at least in part in response to receiving the comment, retrieving at least one additional comment related to the electronic book, the at least one additional comment having been provided by a second user device accessing a second application, the second application providing a second forum in which user devices accessing the second application can perform actions including generating comments relative to electronic books;
   generating activity data associated with the electronic book, the activity data including the comment and the at least one additional comment;
   causing the activity data to be displayed on the first user device via the first application;
   determining (i) that comments associated with the electronic book received via the first application and comments associated with the electronic book received via the second application are maintained on a local database in a manner that supersedes comments stored on a second database that is associated with the second application and is different from the local database or (ii) that the comments associated with the electronic book received via the first application and the comments associated with the electronic book received via the second application are maintained on the second database in a manner that supersedes comments stored on the local database;

at least in part in response to determining that the comments associated with the electronic book received via the first application and comments associated with the electronic book received via the second application are maintained on the local database, causing the comment related to the electronic book to be stored on the local database;

at least in part in response to determining that the comments received via the first service and comments received via the second service are maintained on the second database, sending information associated with the comment to a queue associated with the first application for subsequent sending to the second database;

sending the information associated with the comment from the queue to the second database for writing to the second database;

receiving, at the local database and subsequent to the writing the information associated with the comment to the second database, the activity data from the second database; and writing a replica copy of the activity data received from the second database to the local database.

2. The one or more computing devices of claim 1, the one or more processors further configured to perform operations that include:

receiving an indication that a third user device has accessed the first service;

retrieving, at least partly in response to receiving the indication, the comment from the local database; and instructing display of the comment on a display of the third user device with a graphical indication of the electronic book.

3. Non-transitory computer-readable media maintaining instructions executable by a processor to perform operations comprising:

receiving, from a user device accessing a first service via a first application, a request to write updated data, the first application using first data of a first data type and second data of a second data type to provide the first service;

retrieving, from a first database associated with the first service, data requested to be updated by the request, the first database comprising a local database;

updating the retrieved data with the updated data;

causing the user device to display, via a user interface on a display associated with the user device, a representation of the retrieved data updated with the updated data;

determining (i) that the data requested to be updated is the first data of the first data type and is maintained on the first database in a manner that supersedes other instances of the first data of the first data type, or (ii) that the data requested to be updated is the second data of the second data type and is maintained on a second database in a manner that supersedes other instances of the second data of the second data type, the second database being associated with a second service provided via a second application and being different from the first database, the second application using the first data of the first data type and the second data of the second data type to provide the second service, the second database storing a replica of the first data of the first data type maintained on the first database and the first database storing a replica of the second data of the second data type maintained on the second database;

at least in part in response to determining that the data requested to be updated is of the first data type, causing the updated data to be written to the first database;

at least in part in response to determining that the data requested to be updated is of the second data type, sending the updated data to a queue associated with the first service for subsequent sending to the second database, wherein the queue is separate from the second database and is configured to receive the updated data;

sending the updated data from the queue to the second database for writing to the second database;

receiving, at the first database and subsequent to the writing the updated data to the second database, the updated data from the second database; and writing a replica copy of the updated data received from the second database to the first database.

4. The non-transitory computer-readable media of claim 3, wherein the first database is a replica database accessible by the first service and stores replicas of data maintained on the second database.

5. The non-transitory computer-readable media of claim 3, wherein the request is received as a result of a user interaction with a website displayable by a user device.

6. The non-transitory computer-readable media of claim 3, wherein the user device is associated with a third-party service.

7. The non-transitory computer-readable media of claim 3, the operations further comprising:

writing the updated data to the second database from the queue.

8. The non-transitory computer-readable media of claim 3, the operations further comprising:

queuing the updated data from the second database for subsequent writing to the first database as the replica data.

9. The non-transitory computer-readable media of claim 4, the operations further comprising:

receiving, at an interface of the first service, a request for the updated data;

determining if the first database includes replica data of the requested updated data;

retrieving the replica data from the first database if the replica data is stored in the first database; and sending a request for the requested updated data if the local database does not include the replica data.

10. The non-transitory computer-readable media of claim 9, the operations further comprising:

writing the requested data received from the second service to the replica database.

11. The non-transitory computer-readable media of claim 3, the operations further comprising writing the updated data to a local cache.

12. The non-transitory computer-readable media of claim 11, the operations further comprising:

receiving, at an interface of the first service, a request for the updated data; and requesting a copy of the updated data from the local cache.

13. The non-transitory computer-readable media of claim 12, the operations further comprising receiving the copy of the updated data from the cache if a threshold amount of time since the copy was stored in the cache has yet to elapse.

14. The non-transitory computer-readable media of claim 13, wherein the cache sends a request to refresh the copy of the updated data to the second database if the threshold amount of time since the copy was stored in the cache has elapsed.

15. The non-transitory computer-readable media of claim 3, wherein the request to update data is a request to write at least one of profile information of a user, bibliographic information, user preferences, or user-created content.

16. A computer-implemented method comprising:
causing an activity feed to be displayed on a user interface of a user device at least in part in response to the user device accessing a first service via a first application, the activity feed comprising first information representative of first data of at least one of a first plurality of data types and second information representative of second data of at least one of a second plurality of data types, wherein:
a first database associated with the first service hosted at a first location maintains the first data such that the first data at the first database supersedes all other occurrences of the first data,
a second database different from the first database and associated with a second service accessible via a second application hosted at a second location maintains the second data such that the second data at the second database supersedes all other occurrences of the second data, and
the first data and the second data are used by the first application to provide the first service and by the second application to provide the second service;
receiving, via the user device accessing the first application, a request to add additional information to the activity feed;
determining whether additional data associated with the additional information corresponds to one of the first plurality of data types or one of the second plurality of data types;
at least in part in response to determining that the additional data corresponds to one of the first plurality of data types, storing the additional data on the first database;
at least in part in response to determining that the additional data corresponds to one of the second plurality of data types, writing the additional data to a queue for subsequent updating on the second database, wherein the queue is maintained at the first service and is different from the second database;
sending the additional data from the queue to the second database for updating on the second database;
receiving, at the first database and subsequent to the second database being updated with the additional data, the additional data from the second database; and
writing a replica copy of the additional data received from the second database to the first database.

17. The method of claim 16, further comprising:
receiving an indication of another user device accessing the first service;
at least partly in response to receiving the indication, determining an updated activity feed for displaying in a user interface on the other user device, the updated activity feed comprising third information representative of third data of at least one of the first plurality of data types and fourth information representative of fourth data of at least one of the second plurality of data types; and
querying a local replica database for the fourth data, wherein the local replica database stores replica copies of the second data and the fourth data.

18. The method of claim 17, further comprising receiving the fourth data from the local replica database.

19. The method of claim 18, further comprising:
instructing the other user device to display (i) the third information and (ii) the fourth information corresponding to the replica copy of the fourth data.

20. The method of claim 19, wherein the activity feed comprises descriptors associated with at least one of user comments, a quiz, a user status, a content review, or a content rating.

21. The method of claim 17, wherein a user using the other user device accesses the first service through a site.

22. The method of claim 17, further comprising requesting the fourth data from the second database if the replica copy of the fourth data is absent from the local replica database.

23. The method of claim 17, further comprising:
queuing, at a queue associated with the first service, a request to refresh the replica copy of the fourth data if a threshold amount of time has elapsed since the replica of the requested data was stored in the local replica database; and
transmitting the request to refresh the replica of the requested data to the second database.

24. The method of claim 16, wherein the first service and the second service are book-related and the first plurality of data types comprise a first subset of at least one of user-created, book-related content, book-specific information, or user information and the second plurality of data types comprise a second subset comprising the remainder of the user-created, book-related content, the book-specific information or the user information.

* * * * *